April 18, 1967 N. B. KELL 3,314,401
TWO-STROKE CYCLE ROTARY ENGINE
Filed March 24, 1965 3 Sheets-Sheet 1

INVENTOR.
Nathaniel B. Kell
BY
J. L. Carpenter
ATTORNEY

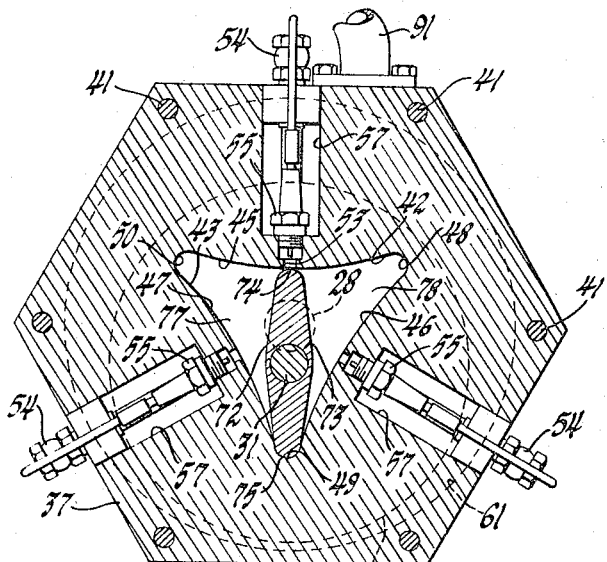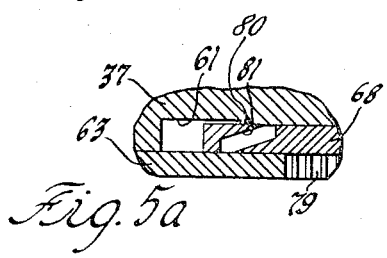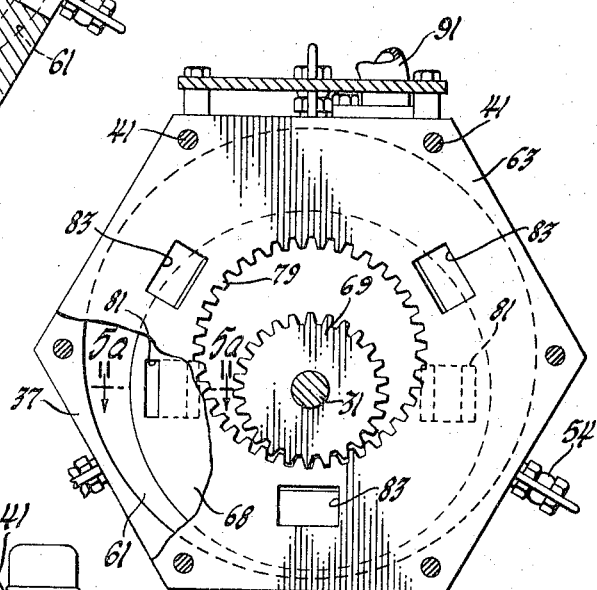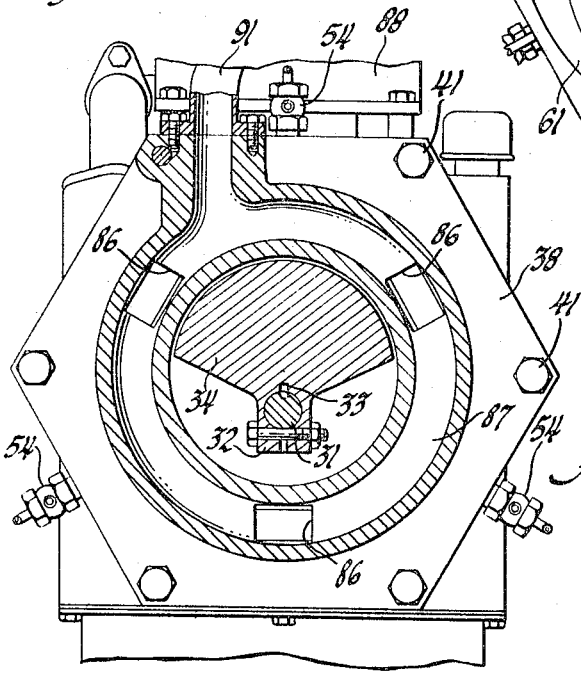

April 18, 1967 N. B. KELL 3,314,401
TWO-STROKE CYCLE ROTARY ENGINE
Filed March 24, 1965 3 Sheets-Sheet 3

INVENTOR.
Nathaniel B. Kell
BY
J. L. Carpenter
ATTORNEY

United States Patent Office 3,314,401
Patented Apr. 18, 1967

3,314,401
TWO-STROKE CYCLE ROTARY ENGINE
Nathaniel B. Kell, Indianapolis, Ind., assignor to General Motors Corporation, Detroit, Mich., a corporation of Delaware
Filed Mar. 24, 1965, Ser. No. 442,364
8 Claims. (Cl. 123—8)

This invention relates to rotary piston engines and, more particularly, to a construction which permits the practical utilization of two-stroke cycle operation in a rotary piston engine.

The development of rotary piston engines has in the past been mainly confined to the use of engines utilizing the four-stroke cycle of operation due, in part, to the fact that control of the inlet and outlet ports by the rotor is simply performed with such a construction. A common arrangement is to have the inlet and outlet ports formed in a peripheral wall which is swept by the apexes of a rotary piston. With such an arrangement, intake and exhaust functions are performed in a different portion of the housing than that in which compression and combustion portions of the cycle take place.

The present invention proposes a rotary piston engine construction arranged to utilize the two-stroke cycle of operation so that more efficient use can be made of the working chambers within the engine. In general, the construction comprises a piston rotor and a housing of any one of several known configurations. The piston rotor carries end plates formed on its ends and extending radially outwardly therefrom to close the ends of the working or combustion chambers. The end plates engage sealing rings or strips in the housing to prevent excessive loss of combustion gases from the chambers and, in addition, include inlet and outlet port means which are moved into communication with each of the engine working chambers during the portion of each cycle in which they reach the largest volume so that exhaust gases can be swept from the chambers and fresh charges of air can be introduced thereinto.

The invention further includes many features and advantages which will be made clear by the succeeding description and drawings in which:

FIGURE 4 is a cross sectional view of the engine of FIGURE 1 taken generally along the line 4—4 and showing the combustion chamber area;

FIGURE 5 is a cross sectional view of the engine shown in FIGURE 1 taken generally along the line 5—5 showing the synchronizing gears and inlet connecting ports and partially broken away to show an end plate inlet port;

FIGURE 5a is a cross sectional view taken generally along the line 5—5 of FIGURE 5 and showing the inlet port shape;

FIGURE 6 is a cross sectional view of the engine of FIGURE 1 taken generally along the line 6—6 and showing the exhaust chamber area;

Figure 1:
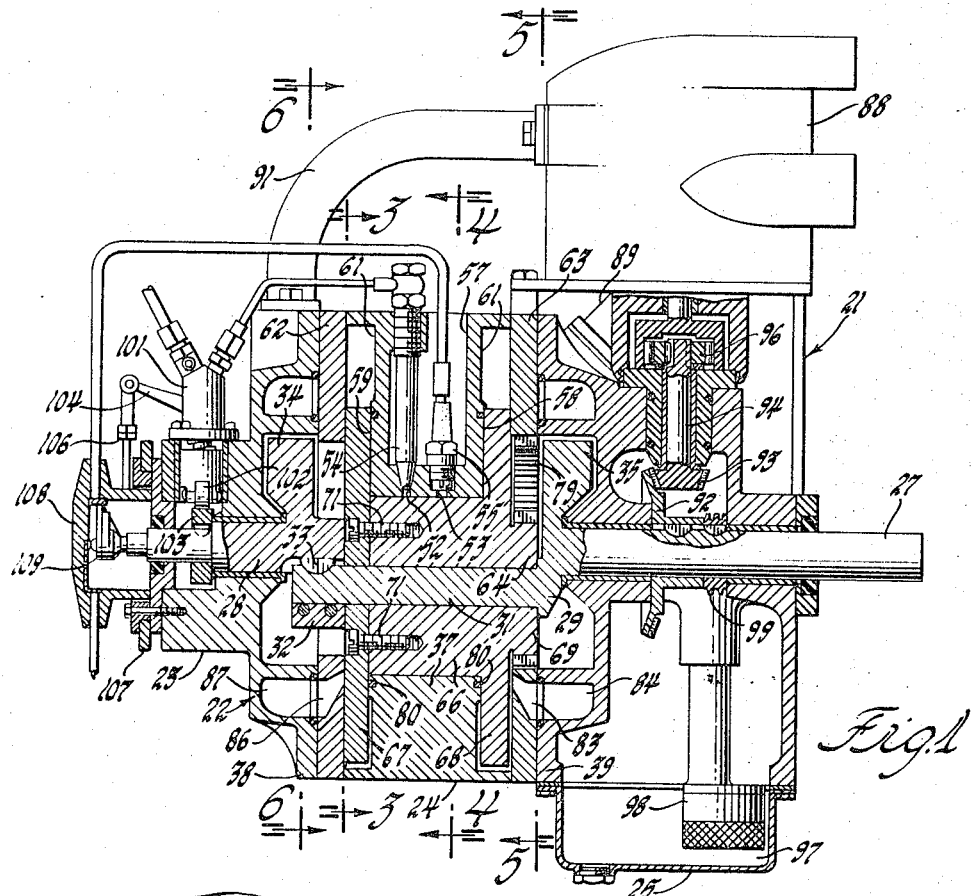
FIGURE 1 is a cross sectional view of one form of rotary engine embodying the invention.
Figure 2:
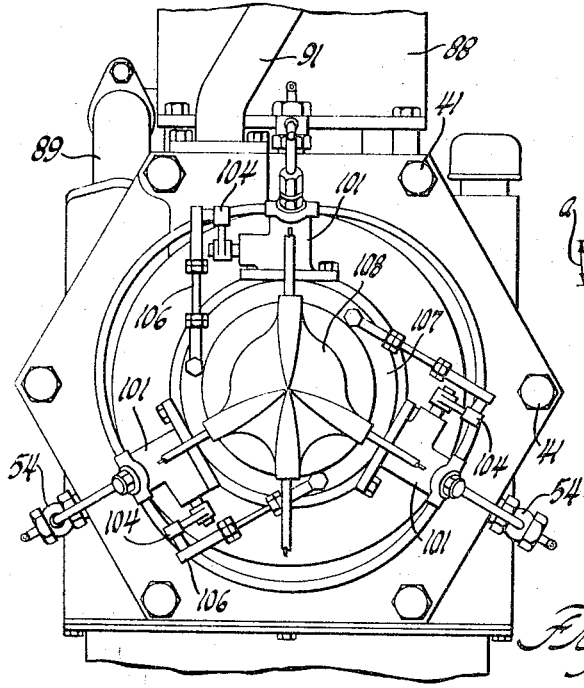
FIGURE 2 is a front end elevation of the engine shown in FIGURE 1.
Figure 3:
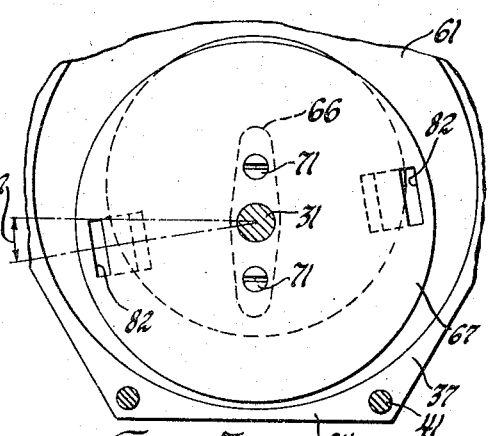
FIGURE 3 is a cross sectional view of the engine of FIGURE 1 taken generally along the line 3—3 and showing the exhaust end plate construction.

Referring now to the drawings, FIGURES 1-6 disclose an engine generally indicated by numeral 21 and comprising a housing 22 made up of a number of components. For descriptive purpose, the engine may be divided into three main sections, a front section 23, a center section 24 and a rear section 25. The front and rear sections rotatably support a two-piece crank-shaft 27 and carry various accessories to be subsequently described, while the center section comprises the working components of the assembly.

In order to provide for ease of assembly, crankshaft 27 is composed of two sections, a front section 28 and a rear section 29 which are journaled in bearings in the front and rear sections of the engine, respectively. Rear section 29 includes an eccentric throw 31 extending through the center portion of the engine. The sections are connected together by suitable clamping means 32 provided on the front section which grip the front end of the throw 31. The angular relationship of the sections is maintained by a key 33. The crankshaft includes counterbalance weights 34 and 35 located on the front and rear sections, respectively, which extend from the crankshaft axis in a direction opposite to the eccentric throw 31, to counterbalance the weight of the throw and of the rotor carried thereon which will be described subsequently.

The center section 24 of the engine includes a casing 37 of generally hexagonal cross section. This casing is secured to hexagonal flanges 38 and 39 of the front and rear sections, respectively, by suitable means such as bolts 41 extending longitudinally through each of the corners of the hexagonal casing.

Centrally located within the casing is an axially extending three-lobed cavity 42 of generally hypotrochoidal configuration. The cavity is defined by a peripheral wall 43 having three combustion wall portions 45, 46 and 47 with slightly inwardly curved surfaces and disposed in generally triangular relationship, as shown in FIGURE 4. The combustion wall portions are connected at their corners by arcuately shaped apexes 48, 49 and 50.

Centrally located in each of the combustion wall portions is a pair of longitudinally spaced openings 52 and 53 which communicates cavity 42 with fuel injectors 54 and spark plugs 55, respectively, carried in recessed portions 57 of the casing exterior.

At its ends, cavity 42 opens through a pair of longitudinally spaced outwardly facing end walls 58 and 59 extending radially outwardly from the cavity and terminating in a pair of annular relieved portions 61. Adjacent the relieved portions, front and rear port plates 62 and 63 are secured to the front and rear portions of the casing respectively. These plates extend transversely across the engine, partially closing the ends of the casing and performing other functions to be subsequently described.

Within the casing 37, a rotor 64 is rotatably journaled on crankshaft throw 31. The rotor is formed of four main components; a two-lobed piston 66, front and rear end plates 67 and 68 and an external timing gear 69. In the construction disclosed, piston 66, end plate 68 and gear 69 are integrally formed, while end plate 67 is secured to the piston by suitable attaching means 71. If desired, these elements could be separately formed or integrated to any degree suitable for efficient manufacture.

Piston 66, as previously indicated, includes two lobes. These extend oppositly from the crankshaft throw forming a pair of working faces 72 and 73 which extend generally longitudinally and laterally across cavity 42, terminating in rounded apexes 74 and 75. The apexes lie closely adjacent peripheral wall 43 dividing the cavity into two combustion chambers 77 and 78.

Rotation of the piston within the cavity is timed in relation to rotation of the crankshaft by the engagement of gear 69 with internal gear teeth 79 formed in rear port plate 63, the ratio of the gears in the disclosed arrangement being 3:2. Thus, the piston moves one revolution for every two revolutions of the crankshaft and the angular rotations of the piston and crankshaft are opposite to one another.

The two end plates 67 and 68 are located one at each end of piston 66 and extend radially outwardly therefrom into the spaces between end walls 58 and 59 and the port plates 62 and 63, respectively. The end plates are of circular configuration and are of sufficient diameter to extend beyond the apexes of cavity 42 at all times, thus, closing the ends of the cavity. Seal rings 80 are provided in end walls 58 and 59. The seal rings extend around the periphery of cavity 42 and engage the inner faces of end plates 67 and 68 to prevent the excessive loss of pressure from the combustion chambers. If desired, separate oil control rings can be utilized to provide proper lubrication control.

Rear end plate 68 includes a pair of oppositely disposed inlet ports 81 extending therethrough and located in a diametral plane generally perpendicular to the piston working faces. These ports are so positioned that upon rotation of the rotor 64 they will alternately and sequentially register with the rear end of the cavity 42 near the apex portions 48, 49 and 50, each of the ports 81 being adapted to communicate with a particular one of the combustion chambers 77, 78, as will be subsequentially more fully described. As shown in FIGURE 5a, the ports may be slanted inwardly to communicate with a portion of of the combustion chamber nearer the cavity axis.

Similarly, front end plate 67 includes a pair of oppositely disposed exhaust ports 82 which are located in a diametral plane preferably displaced at a slight angle $a$ from the plane of inlet ports 81. The exhaust ports are positioned so as to communicate with the cavity 42 at the opposite end from the inlet ports and in a similar manner thereto. The angular displacement of the exhaust ports, with respect to the inlet ports, is preferably such that the exhaust ports lead the inlet ports slightly so that communication of a particular combustion chamber will be established first with an exhaust port and last with an inlet port with an overlapping period of communication with both. The purpose of this relationship between the ports will be described subsequently. It should be obvious that any desired relationship could be established.

The previously mentioned rear port plate 63 contains three connecting ports 83 which are equiangularly displaced in annular relationship and located one opposite each apex of cavity 42. These connecting ports cooperate with the inlet ports 81 to communicate cavity 42 with an annular inlet air chamber 84 formed in the rear section of the engine. Similarly, front port plate 62 contains three connecting ports 86 which are equiangularly displaced in annular relationship and located one opposite each apex of cavity 42. These connecting ports cooperate with the exhaust ports 82 to communicate cavity 42 with an annular exhaust gas chamber 87 formed in the front section of the engine.

The rear portion 25 of the engine carries a supercharger 88 which delivers air to inlet chamber 84 through a connecting pipe 89. The supercharger compressor (not shown) is driven by an exhaust turbine (not shown) which receives exhaust gases from exhaust chamber 87 through an exhaust pipe 91. In addition, supplementary mechanical means are provided to drive the compressor, including a bevel gear 92 which is keyed to the crankshaft and engages another bevel gear 93 carried at one end of a drive shaft 94 at the other end of which an overrunning clutch mechanism 96 is provided. A shaft from the overrunning clutch connects with the supercharger compressor and is so arranged that when sufficient exhaust gas energy is available to drive the compressor faster than it would otherwise be driven by the gear train, the overrunning clutch will release, permitting the higher compressor speed. Superchargers with similar combination drive arrangements have previously been used in conjunction with two-cycle diesel engines.

The rear section of the engine also includes an oil sump 97 in which an oil pump 98, of conventional construction, is located. The oil pump is driven through connection with a drive gear 99 keyed to the crankshaft.

In the front section 23 of the engine, three fuel injection pumps 101 are located, each pump being connected with one of the injectors 54 and including actuating means 102 driven by a cam 103 keyed to the crankshaft. These pump and injector combinations comprise a fuel system of conventional design for supplying fuel to the engine combustion chambers. Control of the rate of fuel injection may be accomplished by actuation of injection pump control arms 104 through suitable connecting links 106 which extend between the control arms and an annular control ring 107, the angular position of which is adjustable by external actuating means (not shown). In addition, electrical distributor means 108, including a crankshaft-mounted rotor 109, are mounted at the front of the engine and connect with the spark plugs 55 to control the spark timing.

The operation of the embodiment heretofore described is as follows. Rotation of the crankshaft 27 in a clockwise direction as viewed from the rear of the engine (see FIGURE 4) causes piston 66 to rotate in a counterclockwise direction. As the piston 66 moves counterclockwise from the FIGURE 4 position, combustion chamber 77 is reduced in volume. It reaches its smallest volume when working face 72 is generally parallel with combustion wall portion 47 and the eccentricity of the crankshaft throw 31 is aligned with the axis of the spark plug 55. This occurs after a craknshaft rotation of 60°. At about this point, fuel is injected into combustion chamber 77 closely following which the spark plug is fired, igniting the mixture in the chamber.

During this 60° movement of the crankshaft, combustion chamber 78 has been increased to its largest volume. Shortly before this occurrence, exhaust port 82 in end plate 67 moves into a position communicating combustion chamber 78 with the connecting port 86 near apex 48, thereby allowing residual exhaust gas pressure from a previous combustion event to be relieved by expansion into exhaust chamber 87. Shortly thereafter, inlet port 81 in end plate 68 is moved into a position communicating the opposite end of combustion chamber 78 with the opposite connecting port 83, permitting fresh air from inlet chamber 84 to enter the combustion chamber and scavenge the remaining exhaust gases from the chamber and into the exhaust system.

Further rotation of the crankshaft closes the exhaust and inlet ports in that order and the air in combustion chamber 78 is compressed as the piston moves around toward a position parallel with the upper wall portion 45 of the cavity. When this occurs, fuel is injected and the spark plug ignites the mixture as previously occurred in combustion chamber 77. In the meantime, combustion chamber 77 has been expanded to its largest volume and the exhaust and inlet ports have communicated the chamber with the inlet and exhaust chambers near apex 49 of the cavity 42 thus sweeping out the spent exhaust products and charging combustion chamber 77 with fresh air.

The motion of the piston within the cavity is completely controlled by the rotation of the crankshaft and the relation of gears 69 and 79 so that, while the opposite apexes of the piston 66 remain closely adjacent peripheral wall 43 of the cavity, there is always a very slight clearance between them. For this reason, retention of satisfactory combustion pressures in combustion chambers 77 and 78 is dependent to some extent on maintaining a relatively high speed of rotor rotation in order to obtain satisfactory engine efficiencies. This arrangement avoids the use of sliding seals mounted in the end portions of the piston which have been somewhat troublesome in other rotary engine constructions. If desired, however, it would be possible to modify the disclosed engine construction to use one of several known types of sealing devices.

The combination of fuel injection and spark ignition is particularly advantageous in the disclosed construction wherein rotary end seals are not used as it prevents an excessive loss of fuel through leakage between the adjacent combustion chambers. The combination is additionally desirable because of the engine's operation on the two-cycle principle since, were a carbureted mixture to be used, some of the fuel mixture might be lost in scavenging the cylinder of exhaust products.

Figure 7:
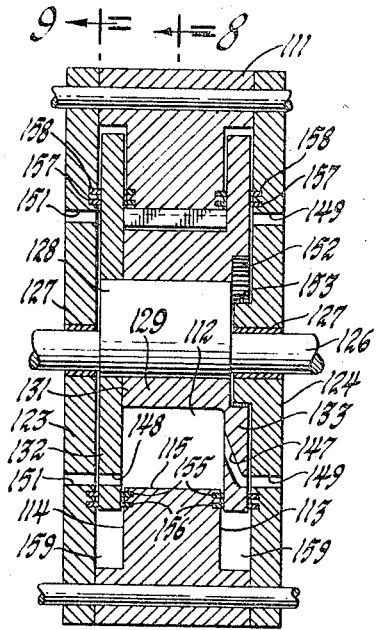
FIGURE 7 is a longitudinal cross sectional view of the center section of an alternative form of rotary piston engine embodying the invention.
Figure 8:
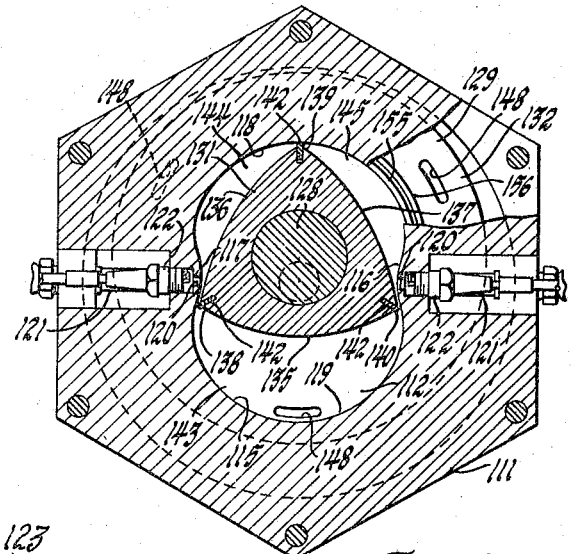
FIGURE 8 is a cross sectional view of the engine of FIGURE 7 taken generally along the line 8—8 and showing the combustion chamber area.
Figure 9:
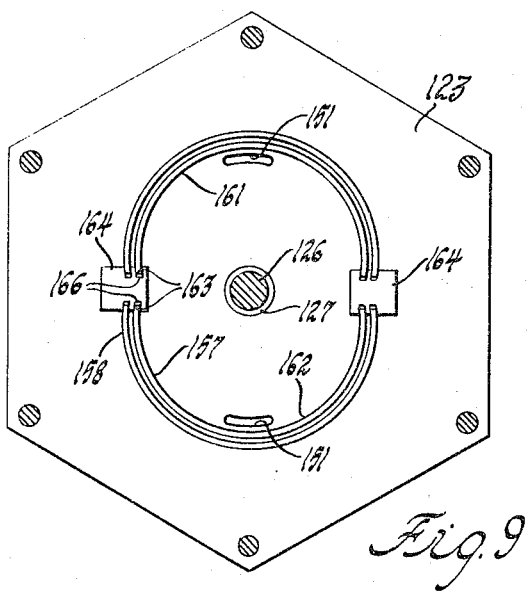
FIGURE 9 is a cross sectional view of the engine of FIGURE 7 taken generally along the line 9—9 and showing one form of sealing means.

Referring now to FIGURES 7, 8 and 9, there is shown an alternative embodiment of an engine embodying principles of the instant invention. Only the center section of the engine is shown, as the construction of the front and rear portions of the engine is nearly identical to that of the engine disclosed in FIGURES 1–6.

The primary purpose of disclosing the embodiment of FIGURES 7–9 is to show the application of the principles of the instant invention to rotary engines of the type having a rotor operating within a cavity of generally epitrochoidal configuration. As shown in FIGURE 8, the embodiment presented herein comprises a three-lobed piston operating within a two-lobed generally epitrochoidal cavity.

The casing 111 is generally similar to that of the first described embodiment and includes a two-lobed central cavity 112 extending longitudinally between a pair of spaced outwardly facing end walls 113 and 114. The casing 111 differs from that of the first described embodiment mainly in that the cavity 112 approximates a two-lobed epitrochoid. The cavity is defined by a peripheral wall 115 which comprises slightly inwardly curved opposed side wall portions 116 and 117 connected together by outwardly curved end portions 118 and 119.

The side wall portions 116 and 117 are comparable in function to the combustion wall portions 45, 46 and 47 of the first disclosed embodiment, thus centrally disposed axially spaced openings 120 are provided in wall portions 116 and 117 connecting the cavity 112 with fuel injection means 121 and spark ignition means 122 mounted in the same manner as in the first disclosed embodiment.

In this embodiment front and rear port plates 123 and 124, respectively, are used as before; however, for reasons subsequently given, clearance for crankshaft eccentricity cannot be provided in the port plates and, therefore, the crankshaft 126 is carried in bearings 127 mounted in the port plates themselves. As a consequence, the construction of the crankshaft throw must be altered and, in the arrangement shown, a large eccentric portion 128 extending between the port plates is utilized.

A rotor 129 is rotatably journaled within the casing 111 on the crankshaft eccentric portion 128. In this instance, the rotor is made up of a three-lobed piston 131 and a pair of end plates 132 and 133.

The piston 131 comprises three outwardly curved working faces 135, 136 and 137 disposed in generally triangular relationship and connected by apexes 138, 139 and 140. Seal members 142 extend longitudinally along the apexes and engage the peripheral wall 115 at all times to separate cavity 112 into three combustion chambers 143, 144 and 145.

The porting in the end plates and port plates is similar to that of the previously described embodiment in that the ports on the end plates are equal in number to the piston working faces and each port is outboard of the approximate center of one of the piston working faces. In like manner, the ports in the port plates are equal in number to, and generally in line with, the ends or apexes of the cavity. In the present embodiment, therefore, this means that the end plates 132 and 133 each include three equiangularly spaced ports arranged in annular relationship. As shown, the inlet ports 147 have their inner portions directed radially inwardly to sweep the fresh air charge toward the inner portion of the combustion chamber while the exhaust ports 148 are longitudinally directed to remove the exhaust gases from the outer portion of the combustion chamber. The arrangement further requires that the port plates 123 and 124 each include only two oppositely disposed connecting ports with both the two inlet connecting ports 149 and the two exhaust connecting ports 151 being located generally opposite the ends 118 and 119 of the cavity 112 so as to communicate the end plate inlet and exhaust ports with their respective inlet and exhaust chambers in the front and rear portions (not shown) of the engine.

A further difference in this embodiment is the requirement that the piston rotate within the casing in the same direction as the direction of crankshaft rotation but at one-third the rotational speed. This requires a 3:2 gear ratio between the stationary end plate and the rotor be maintained and this is accomplished in the present construction by having internal gear teeth 152 formed on the inlet end plate 133 and an external gear 153 formed integral with the rear port plate 124 and in engagement with the gear teeth 152. It is because of this need for forming the external gear as a part of port plate 124 that clearance for the crankshaft throw cannot be provided in the port plate.

The present embodiment also incorporates a slightly different arrangement of end plate seals than that previously shown but which could be utilized in any embodiment to which the herein disclosed end plate construction could be applied. In this arrangement, peripheral compression seals 155 and oil seals 156 are provided in the end walls 113 and 114 of the casing. The seals engage the inner faces of the end plates 132 and 133 to prevent the loss of combustion pressures and control oil consumption. In addition, pairs of compression and oil seals 157 and 158, respectively, are also carried in the port plate 123 and 124, bearing against the outer faces of the end plates to prevent gas flow into the clearance areas 159 in which the end plates rotate.

In FIGURE 9 a possible construction for the compression seals 157 and oil seals 158 is shown. Each compression seal is formed from two separate segments 161 and 162 which are segments of perfect circles. The ends of the segments are received in slots 163 provided in inserts 164 which are equal in thickness to the thickness of each segment. Clearance 166 is provided between the end of each segment and the slot receiving it to allow for expansion of the ring during engine operation. The oil control seals 158 are similarly constructed and received in other slots of the same inserts. The compression and oil control seals 155 and 156 may also be similarly constructed. If desired, however, any of the pairs of compression and oil seals could be made in continuous shapes and be used without inserts.

The operation of the second disclosed embodiment is generally similar to that of the embodiment first disclosed and is thought to be obvious from the foregoing description.

It is to be understood that numerous changes could be made in the engine embodiments shown herein which would fall within the purview of the invention herein disclosed and the invention is, therefore, intended to be limited only by the language of the appended claims.

I claim:
1. A two-stroke cycle rotary engine comprising
a casing having an inwardly facing peripheral wall and
a pair of axially spaced outwardly facing end walls connecting with and extending radially outwardly from said peripheral wall, a rotor rotatably received in said casing and including a piston adapted to cooperate with said peripheral wall to form a plurality of combustion chambers therebetween, said rotor further including a pair of end plates disposed one at each end of said piston and extending radially outwardly thereof into overlapping relationship with said end walls thereby closing the ends of said combustion chambers, said piston being adapted to rotate eccentrically within said peripheral wall so as to cause the volume of said combustion chambers to be sequentially increased and decreased in a ratio sufficient for internal combustion engine operation, inlet and exhaust means opening to said end plates and inlet and exhaust ports in said end plates and arranged to communicate each of said combustion chambers with both said inlet and exhaust means during a portion of each cycle near the maximum volume condition of each said combustion chamber.

2. A two-stroke cycle rotary engine comprising a casing having an inwardly facing peripheral wall and a pair of axially spaced outwardly facing end walls connecting with and extending radially outwardly from said peripheral wall, a rotor rotatably received in said casing and including a piston adapted to cooperate with said peripheral wall to form a plurality of combustion chambers therebetween, said rotor further including a pair of end plates disposed one at each end of said piston and extending radially outwardly thereof into overlapping relationship with said end walls thereby closing the ends of said combustion chambers, said piston being adapted to rotate eccentrically within said peripheral wall so as to cause the volume of said combustion chambers to be sequentially increased and decreased in a ratio sufficient for internal combustion engine operation, seal means between said end plates and their respective end walls to seal the edges of said combustion chambers, inlet and exhaust means in said casing and opening to said end plates, inlet and exhaust ports in said end plates and arranged to communicate each of said combustion chambers with both said inlet and exhaust means during a portion of each cycle near the maximum volume condition of each said combustion chamber and a scavenging blower connected with said inlet means to supply a fresh air charge to and sweeep exhaust products from, said combustion chambers during communication of said inlet and exhaust means therewith.

3. A two-stroke cycle rotary engine as defined in claim 2 and further including fuel injection means in said peripheral wall to supply fuel to said combustion chambers and ignition means in said peripheral wall to ignite the fuel in said combustion chambers.

4. A two-stroke cycle rotary engine comprising a casing including a pair of outwardly facing axially spaced end walls connected by a peripheral wall to form a cavity having an axis, said axially spaced end walls being generally perpendicular to said axis and extending radially outwardly of said peripheral wall, first and second port plates secured to opposite ends of said casing and axially spaced outwardly of said end walls, said port plates each including a plurality of connecting ports extending therethrough, said ports being equiangularly disposed radially outward of said cavity axis, said cavity including a central portion of substantially trochoidal cross section defined by said peripheral wall and symmetric about said axis and a pair of end portions extending radially outwardly of said central portion and defined by said outwardly facing axially spaced end walls and said port plates, a rotor received in said cavity and comprising a piston including a plurality of working faces symmetrically disposed about a central axis, said working faces being connected together by an equal number of apexes, said piston cooperating with said cavity central portion to form a plurality of combustion chambers between said peripheral wall and said working faces, said combustion chambers being substantially coextensive with said piston working faces and being separated from one another by cooperation of said apexes with said peripheral wall, said piston being mounted for eccentric rotation within said peripheral wall so as to cause the volumes of said combustion chambers to be sequentially increased and decreased, said rotor including first and second generally circular end plates axially spaced from one another and disposed one at each end of said piston, said end plates extending radially outwardly of said piston into said cavity end portions and overlapping said axially spaced end walls to close the ends of said combustion chambers, inlet and exhaust means connected with the connecting ports of said first and second port plates respectively, a plurality of inlet ports in said first end plate and adapted to cooperate with the connecting ports of said first port plate to communicate said inlet means with each of said combustion chambers during predetermined portions of the engine cycle near the maximum volume condition of each said combustion chamber, said first end plate preventing such communication during the remaining portions of said cycle, and a plurality of exhaust ports in said second end plate and adapted to cooperate with the connecting ports of said second port plate to communicate said exhaust means with each of said combustion chambers during predetermined portions of the engine cycle near the maximum volume condition of each said combustion chamber and at least partially overlapping the period of communication of said inlet means therewith, said second end plate preventing such communication during the remaining portions of said cycle.

5. A two-stroke cycle rotary engine as defined in claim 4 wherein said cavity includes a plurality of lobes equiangularly disposed about said cavity axis, said lobes being equal in number to the connecting ports of each of said port plates and being angularly aligned therewith.

6. A two-stroke cycle rotary engine as defined in claim 5, said inlet ports and said exhaust ports being equal in number to said combustion chambers, each of said exhaust ports being disposed generally opposite a corresponding inlet port and slightly angularly displaced therefrom whereby the beginning of each communication of said exhaust means with each said combustion chamber slightly precedes the beginning of a corresponding communication of said inlet means with the same combustion chamber.

7. A two-stroke cycle rotary engine comprising a casing including a pair of outwardly facing axially spaced end walls connected by a peripheral wall to form a cavity having an axis, said axially spaced end walls being generally perpendicular to said axis and extending radially outwardly of said peripheral wall, first and second port plates secured to opposite ends of said casing, and axially spaced outwardly of said end walls, said port plates each including a plurality of connecting ports extending therethrough, said ports being equiangularly disposed radially outward of said cavity axis, said cavity including a central portion of substantially trochoidal cross section defined by said peripheral wall and symmetric about said axis and a pair of end portions extending radially outwardly of said central portion and defined by said outwardly facing axially spaced end walls and said port plates, a rotor received in said cavity and comprising a piston including a plurality of working faces symmetrically disposed about a central axis, said working faces being connected together by an equal number of apexes, said piston cooperating with said cavity central portion to form a plurality of combustion chambers between said peripheral wall and said working faces, said combustion chambers being substantially coextensive with said piston working faces and being separated from one another by cooperation of said apexes with said peripheral wall, said rotor including first and second generally circular end plates axially spaced from one another and disposed one at each end of said piston, said end plates extending radially outwardly of said piston into said cavity end portions and overlapping said axially spaced end walls to close the ends of said combustion chambers, seal means between said piston end plates and said casing axially spaced end walls to prevent leakage of fluids through the edges of said combustion chambers, means to move the central axis of said piston rotatably about the axis of said cavity at a fixed distance therefrom, said piston central axis being maintained parallel to said cavity axis, means to rotate said piston about its central axis in a predetermined direction and at a predetermined angular velocity with respect to rotation of said piston central axis about said cavity axis, rotation of said axis and of said piston about said axis being effective to cause the volumes of said combustion chambers to be sequentially increased and decreased, inlet and exhaust means connected with the connecting ports of said first and second port plates respectively, a plurality of inlet ports in said first end plate and adapted to cooperate with the connecting ports of said first port plate to communicate said inlet means with each of said combustion chambers during predetermined portions of the engine cycle near the maximum volume condition of each said combustion chamber, said first end plate preventing such communication during the remaining portions of said cycle, and a plurality of exhaust ports in said second end plate and adapted to cooperate with the connecting ports of said second port plate to communicate said exhaust means with each of said combustion chambers during predetermined portions of the engine cycle near the maximum volume condition of each said combustion chamber and at least partially overlapping the period of communication of said inlet means therewith, said second end plate preventing such communication during the remaining portions of said cycle.

8. A two-stroke cycle rotary engine as defined in claim 7 and further including a scavenging blower connecting with said inlet means to deliver pressurized air thereto, said blower being gear driven from said crankshaft and including separate means for driving said blower by means of the exhaust gases passing from said exhaust means.

References Cited by the Examiner

UNITED STATES PATENTS

| | | |
|---|---|---|
| 1,753,476 | 4/1930 | Richer. |
| 1,790,280 | 1/1931 | Nichol. |
| 2,162,771 | 6/1939 | Winans. |
| 2,988,065 | 6/1961 | Wankel et al. _____ 123—8 |
| 3,224,421 | 12/1965 | Peras _____ 123—8 |

MARK NEWMAN, *Primary Examiner.*

F. T. SADLER, *Assistant Examiner.*